United States Patent
Zou et al.

(10) Patent No.: US 10,605,921 B2
(45) Date of Patent: Mar. 31, 2020

(54) FULL-SPECTRUM COVERING ULTRA WIDEBAND ALL PHOTONICS-BASED RADAR SYSTEM

(71) Applicant: Shanghai Jiao Tong University, Shanghai (CN)

(72) Inventors: Weiwen Zou, Shanghai (CN); Hao Zhang, Shanghai (CN); Siteng Zhang, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 299 days.

(21) Appl. No.: 15/833,992

(22) Filed: Dec. 6, 2017

(65) Prior Publication Data

US 2018/0106904 A1    Apr. 19, 2018

Related U.S. Application Data

(63) Continuation of application No. PCT/CN2015/088463, filed on Aug. 29, 2015.

(30) Foreign Application Priority Data

Aug. 17, 2015  (CN) .......................... 2015 1 0501404

(51) Int. Cl.
    *G01C 3/08*    (2006.01)
    *G01S 17/88*   (2006.01)
    (Continued)

(52) U.S. Cl.
    CPC ............... *G01S 17/88* (2013.01); *G01S 7/03* (2013.01); *G01S 7/28* (2013.01); *G01S 13/0209* (2013.01); *G01S 13/26* (2013.01)

(58) Field of Classification Search
    CPC ... G01S 17/88; G01S 7/28; G01S 7/03; G01S 13/0209; G01S 13/26
    (Continued)

(56) References Cited

U.S. PATENT DOCUMENTS 10,191,145 B2 *   1/2019  Swanson .............. A61B 5/0066
2004/0062469 A1 *  4/2004  Ionov ..................... H04B 10/11
                                              385/15

(Continued)

FOREIGN PATENT DOCUMENTS

| CN | 103064199 A | 4/2013 |
| CN | 103913645 A | 6/2014 |
| CN | 104297731 A | 1/2015 |

OTHER PUBLICATIONS

P. Ghelfie et al., "A fully photonics-based coherent radar system," Nature, vol. 7492, No. 507, pp. 341-345 (Mar. 20, 2014).
(Continued)

*Primary Examiner* — Mark Hellner
(74) *Attorney, Agent, or Firm* — Mei & Mark LLP; Manni Li

(57) ABSTRACT

A full-spectrum covering ultra wideband full-photonics based radar system comprising a signal transmitter, a transceiver module, and a signal receiver. The signal transmitter comprises a mode-locked laser, a first dispersion module, a first optical coupler, a second optical coupler, a first optical filter, a second dispersion module, a second optical filter, a first adjustable time delay module, a third optical coupler, an optical amplifier, and a first photodetector; the transceiver module comprises a band selector, a first electrical amplifier array, a T/R component array, an antenna array, and a second electrical amplifier array; the signal receiver comprises a third optical filter, a second adjustable time delay module, an electro-optical modulator, a third dispersion module, a second photodetector, an analog-digital conversion module, and
(Continued)

a signal processing module. The system has continuous tunability for center frequency, bandwidth, and time width of the wideband signal with high coherence and ranging accuracy.

4 Claims, 7 Drawing Sheets

(51) Int. Cl.
    *G01S 13/02*     (2006.01)
    *G01S 7/03*     (2006.01)
    *G01S 13/26*     (2006.01)
    *G01S 7/28*     (2006.01)

(58) Field of Classification Search
    USPC .......................................................... 356/4.01
    See application file for complete search history.

(56) References Cited

U.S. PATENT DOCUMENTS

2016/0054431 A1     2/2016    Zou et al.
2017/0163351 A1*   6/2017    Puleri .................. H01Q 3/2676

OTHER PUBLICATIONS

J. McKinney, "Photonics illuminates the future of radar," Nature, vol. 7492, No. 507, pp. 310-312 (Mar. 20, 2014).

Su, Bingrong et al., "Multiband Radar," Proceedings of The Fifteenth Annual Meeting of the Professional Radar Information Network of the Ministry of Industry and Information Technology, pp. 26-32 (2003 or later).

H. Zhang et al., "Generation of widely tunable linearly-chirped microwave waveform based on spectral filtering and unbalanced dispersion," Optics Letters, vol. 40, No. 6, pp. 1085-1088 (2015).

Y. Han et al., "Photonic time-stretched analog-to-digital converter: Fundamental concepts and practical considerations," Journal of Lightwave Technology, vol. 21, No. 12, pp. 3085-3103 (2003).

* cited by examiner

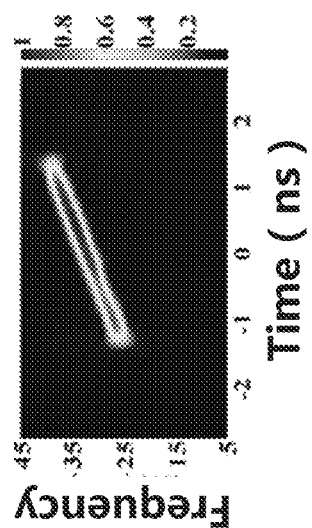
Figure 4(a)
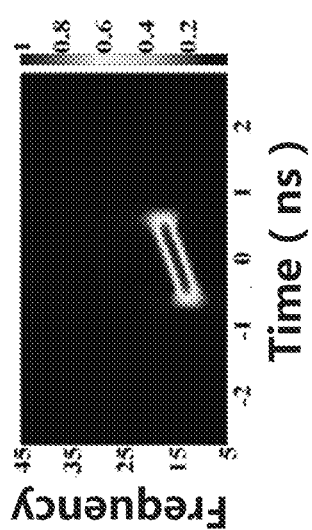
Figure 4(b)
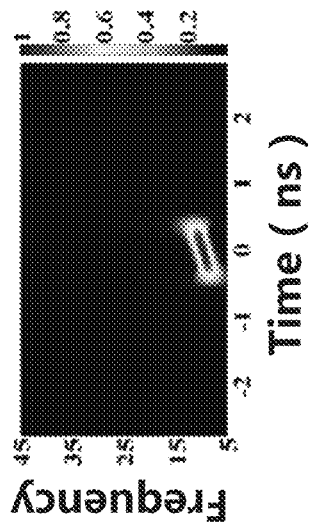
Figure 4(c)
Figure 4

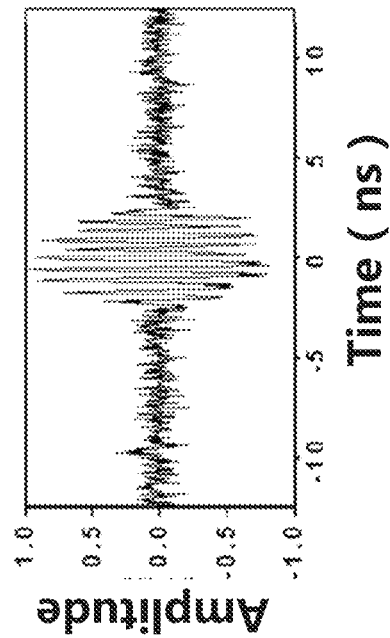
Figure 6(a)
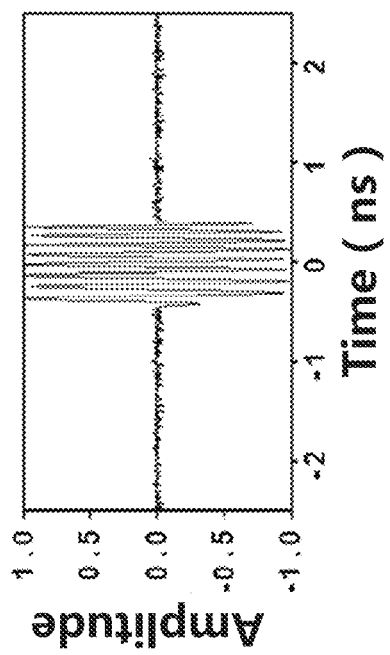
Figure 6(b)
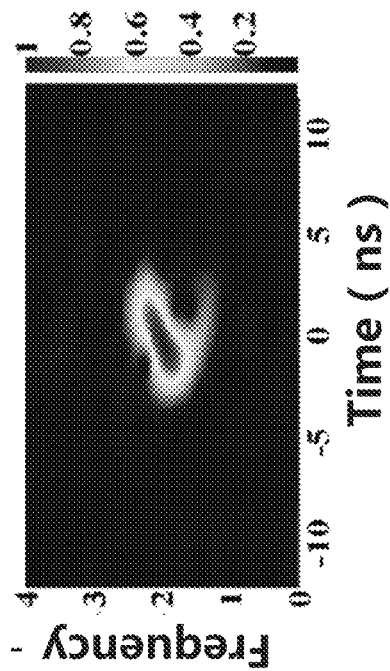
Figure 6(c)
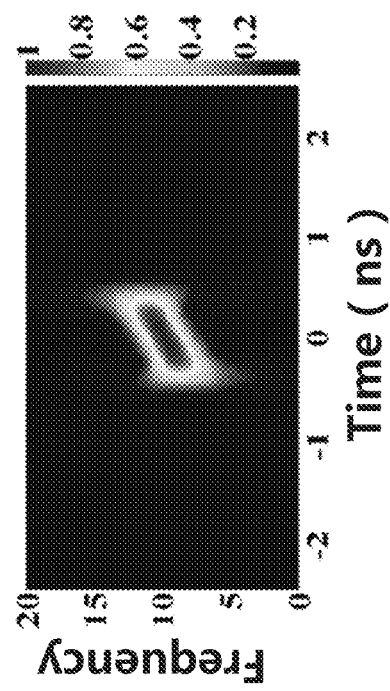
Figure 6(d)
Figure 6

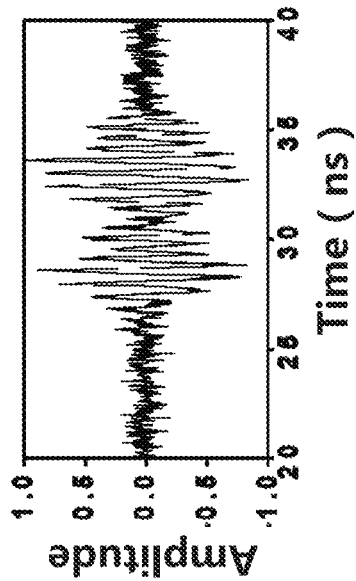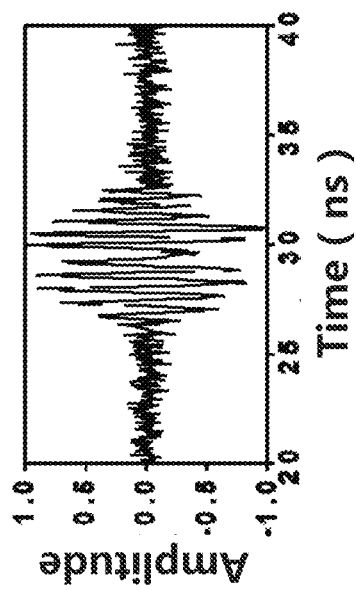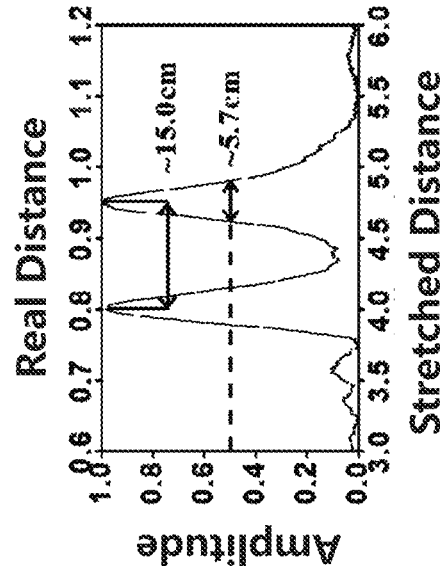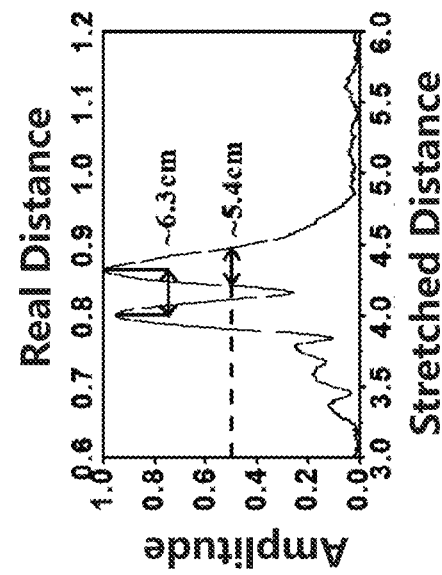
Figure 7(a)  Figure 7(b)  Figure 7(c)  Figure 7(d)
Figure 7

FULL-SPECTRUM COVERING ULTRA WIDEBAND ALL PHOTONICS-BASED RADAR SYSTEM

CROSS-REFERENCE TO RELATED APPLICATIONS

The subject application is a continuation of PCT/CN2015/088463 filed on Aug. 29, 2015 and claims priority on Chinese application no. 201510501404.3 filed on Aug. 17, 2015. The contents and subject matter of the PCT and Chinese priority application are incorporated herein by reference.

FIELD OF INVENTION

The present invention relates to microwave optics and radar, particularly, a full-spectrum covering ultra wideband full photonics-based radar system.

BACKGROUND ART

As photonics developed since 1980s, the concept of full photonics-based radar has been proposed and attracted wide attention from relevant research at home and abroad. Photonics possesses the advantages of large bandwidth, low loss, and low jitter, with application thereof being capable of breaking the "electronic bottleneck" existing in the traditional microwave/millimeter-wave radar systems, thus furnishing a new technical channel for generation, reception, and processing of a higher frequency and larger bandwidth wideband signal. Directed at the requirement for the carrier frequency and agility by a radar system, a full photonics-based coherent radar system has been realized. See, A full photonics-based coherent radar system, P. Ghelfi et al., Nature, vol. 507, no. 7492, pp. 341-345, 2014. Radar signal generation and reception in the system both come from the same mode-locked laser, thus insuring high coherence of the system, effectively inhibiting jitter of phase noise, and increasing radar detection accuracy. The system proves to have higher quantitative fidelity and detection accuracy in a validating demonstration with a 40 GHZ narrow band radar. Due to the excellent property of the system, the research by P. Ghelfi et al. has the potential to become a norm for designing the next generation radar system. See, Technology: Photonics illuminates the future of radar, J. McKinney, Nature, 2014, vol. 507, no. 7492, pp. 310-312, March 2014.

A radar system, like those in other wireless techniques, may only properly work under pre-designed bandwidths. A multiband radar may simultaneously or in a cross gating manner works in multiple bands, and thus has a higher probability over a common radar to detect a target. Due to the multiple frequency components contained in a signal transmitted by a multiband wideband radar, it is capable of breaking the wave-absorbing effect of narrowband frequency absorption materials, thus effectively increasing the anti stealth detection capability thereof. A multiband radar is further advantageous in inhibiting and dodging enemy ejected interference, which is crucial in increasing detection capability, in decreasing multipath loss and in strengthening self survival rate. See, Multiband Radar [C], Proceedings of The Fifteenth Annual Meeting of the Professional Radar Information Network of the Ministry of Industry and Information Technology, Su Bingrong, He Bingfa.

In actual applications, a microwave/millimeter-wave radar generally employs the following signal waveforms: short pulse signal, phase-coded signal, or chirp signal. Transmission and receiving techniques are very hard to implement for a short pulse signal, due to the extremely stringent requirement for the pulses thereof in high precision ranging, i.e., the requirement for an extremely narrow pulse width. A phase-coded signal is realized by loading phase information onto a continuous carrier wave according to defined time intervals, albeit has a comparatively high precision and sidelobe suppression ratio, is not suitable for a wideband system, due to the difficult implementation and its susceptibility to Doppler effect and limitation by its own dynamic range. In contrast, a chirp signal is widely employed in high precision ranging and radar detection, with ranging accuracy dependent on its modulated bandwidth, and is an ideal choice for a microwave/millimeter-wave radar.

SUMMARY OF THE INVENTION

The present invention provides a full-spectrum covering ultra wideband full-photonics based radar system by overcoming the defects of the prior art. The same mode-locked laser with low jitter and wide spectrum is adopted for respectively generating and receiving an ultra wideband chirp signal to guarantee high coherence and high detection precision for the transceiver system. The signal transmitter realizes continuous tunability for center frequency, bandwidth and time width of an ultra wideband signal by making use of the wide spectrum of the mode-locked laser and an unbalanced dispersion chirp on both arms thereof, thus realizing full-spectrum coverage and generation of the ultra wideband signal with any arbitrary operating waveband. The signal receiver greatly mitigates back-end analog-digital converting and processing pressure by making use of time stretching in compressing the center frequency and bandwidth of the wideband signal, with target range resolution still remaining in the accuracy prior to time stretching.

The full-spectrum covering ultra wideband full-photonics based radar system of the present invention comprises a signal transmitter, a transceiver module, and a signal receiver; the signal transmitter comprises a mode-locked laser, a first dispersion module, a first optical coupler, a second optical coupler, a first optical filter, a second dispersion module, a second optical filter, a first tunable time delay module, a third optical coupler, an optical amplifier, and a first photodetector; the transceiver module comprises a band selector, a first electrical amplifier array, a T/R component array, an antenna array, and a second electrical amplifier array; the signal receiver comprises a third optical filter, a second tunable time delay module, an electro-optical modulator, a third dispersion module, a second photodetector, an analog-digital conversion module, and a signal processing module. The interrelations of the above components are as follows:

An output end of the mode-locked laser is connected via the first dispersion module with an input end of the first optical coupler having a first output end and a second output end, the first output end of the first optical coupler is connected with an input end of the second optical coupler, the second optical coupler splits an optical path into a first optical path and a second optical path, with the first optical path traversing successively the first optical filter and the second dispersion module till an input end of the third optical coupler, the second optical path traversing successively the second optical filter and the first tunable time delay module till the input end of the third optical coupler;

the third optical coupler couples a signal of the first optical path and of the second optical path respectively into one optical signal and outputs via the optical amplifier to enter the first photodetector, the first photodetector converts the optical signal into an electrical signal and inputs to an input end of the band selector of the transceiver module, the band selector having more than 2 output ends, with each said output end of the band selector connected successively with a respective electrical amplifier of the first electrical amplifier array, a respective T/R component of the T/R component array, and a respective antenna of the antenna array to form a channel for a respective waveband;

an echo signal of an electrical signal transmitted from the antenna array is returned by a to be detected target and passes successively via the respective antenna of the antenna array, the respective T/R component of the T/R array and the second electrical amplifier array to form a target echo electrical signal to be inputted to an rf input end of the electro-optical modulator;

an optical signal of the second output end of the first optical coupler successively passes via the third optical filter and the second tunable time delay module to be inputted into an optical input end of the electro-optical modulator to form an optical pulse carrier wave; and the electro-optical modulator loads the target echo electrical signal onto the optical pulse carrier wave to form an echo modulation optical signal corresponding to the target echo electrical signal, with the echo modulation optical signal of the electro-optical modulator successively passing via the third dispersion module, the second photodetector, and the analog-digital conversion module to enter the signal processing module.

In the present invention, the mode-locked laser is a mode-locked laser with low jitter and wide spectrum.

In the present invention, the filtering bandwidth of the third optical filter is greater than a filtering bandwidth of the first optical filter and that of the second optical filter.

The principle for generating the wideband chirp signal in the signal transmitter is based on spectral filtering and unbalanced dispersive chirping. See H. Zhang et al., Generation of widely tunable linearly—chirped microwave waveform based on spectral filtering and unbalanced dispersion, Optics Letters, vol. 40, no. 6, pp. 1085-1088, 2015. The contents of the reference is incorporated herein by reference. By means of tuning the center wavelength and filtering bandwidth of the first tunable optical filter and those of the second optical filter, the center frequency and the sweep bandwidth of the wideband chirp signal is changed.

While in the signal receiver, bandwidth compression and down conversion for the outputted signal from the transceiver module subsequent to electro-optical conversion is realized by means of borrowing from the principle of time stretching. See Y. Han et al., Photonic time-stretched analog-to-digital converter: Fundamental concepts and practical considerations, Journal of Lightwave Technology, vol. 21, no. 12, pp. 3085-3103, 2003. The radar echo signal is loaded via the electro-optical modulator onto the previously dispersion-chirped optical pulse carrier wave, forming the modulation optical signal corresponding to the radar echo signal. With the prerequisite of the filtering bandwidth of the third optical filter being greater than that of the first optical filter and that of the second optical filter, and by means of properly tuning the second tunable time delay module, echo signals from multiple targets are loaded onto the optical carrier wave. Subsequent to passing via the third dispersion module having much more dispersion, an electrical signal time-stretched multiple times of factor is obtained from the second photodetector. If the dispersion coefficients of the first dispersion module and the third dispersion module are respectively $D_1$ and $D_3$, then the stretch factor M is dependent thereon:

$$M = \frac{D_3}{D_1} + 1$$

Time stretching of the to be sampled rf signal is equivalent to compression in frequency domain, and thus pressure on bandwidth and sampling ratio for the back-end analog-digital converter is greatly mitigated. Useful target information is then extracted from the analog-digitally converted signal by means of digital processing, with target ranging resolution remaining in the accuracy prior to time stretching.

The present invention is advantageous in the following aspects:

1. The signal transmitter and the signal receiver of the present invention are both based on the same mode-locked laser, thus insuring high coherence in signal generation and processing, and drastically increasing ranging detection accuracy for the present invention.

2. By means of tuning the first optical filter and the second optical filter, the present invention is capable of generating wideband chirp signal covering the full spectrum or with any specific waveband.

3. The present invention makes use of time stretching to time stretch the to be sampled signal and compress it in frequency domain, thus drastically mitigating pressure on bandwidth and sampling ratio for the back end analog-digital conversion module.

4. A switchable transceiving channel for the radar signals with full-spectrum covering or of multiple wavebands of the present invention is adopted, thus realizing uniform transceiving for the full spectrum of wavebands.

5. The target ranging resolution of the present invention is dependent on the bandwidth of the radar signal generated by the transmitter, and is not related to the time stretching factor.

BRIEF DESCRIPTION OF THE DRAWINGS

FIG. 3 shows test results for characteristics of the full-spectrum covering wideband chirp signal of the present invention, among which, FIG. 3(a) shows the time domain waveform, and FIG. 3(b) shows the short time Fourier transformation analysis.

FIG. 4 shows test results for short time Fourier analysis of the chip signals with various wavebands in the present invention, among which, FIG. 4(a) shows the X waveband, FIG. 4(b) shows the Ku waveband, and FIG. 4(c) shows the Ka waveband.

FIG. 5 is a schematic diagram showing an experiment of a single target detection and a double target detection for an embodiment of the present invention employing the generated X waveband signal, among which, FIG. 5(a) shows the single target detection, and FIG. 5(b) shows the double target detection.

FIG. 6 shows test results for the time domain waveform and the short time Fourier analysis of the X waveband chirp signals prior to and subsequent to time stretching in the single target detection in the present invention, among which, FIG. 6(a) shows the time domain prior to time stretching, FIG. 6(b) shows the time domain subsequent to time stretching, FIG. 6(c) shows the short time Fourier analysis prior to time stretching, and FIG. 6(d) shows the short time Fourier analysis subsequent to time stretching.

FIG. 7 shows time and distance test results between the targets in the double target detection in the present invention, among which, FIG. 7(a) shows the time domain subsequent to time stretching at a distance of ~6.3 cm, FIG. 7(b) shows the time domain subsequent to time stretching at a distance of ~15.0 cm, FIG. 7(c) shows the inter-positions of the both targets subsequent to matched filtering at a distance of ~6.3 cm, and FIG. 7(d) shows the inter-positions of the both targets subsequent to matched filtering at a distance of ~15.0 cm.

DETAILED DESCRIPTION OF THE INVENTION AND EMBODIMENTS

The present invention will be expounded in more details with the figures and an embodiment hereunder provided. The embodiment is implemented based on the technical solution of the present invention and provided with detailed implementing modes and specific operation procedures, but is not meant to limit the scope of protection of the present invention.

Figure 1:
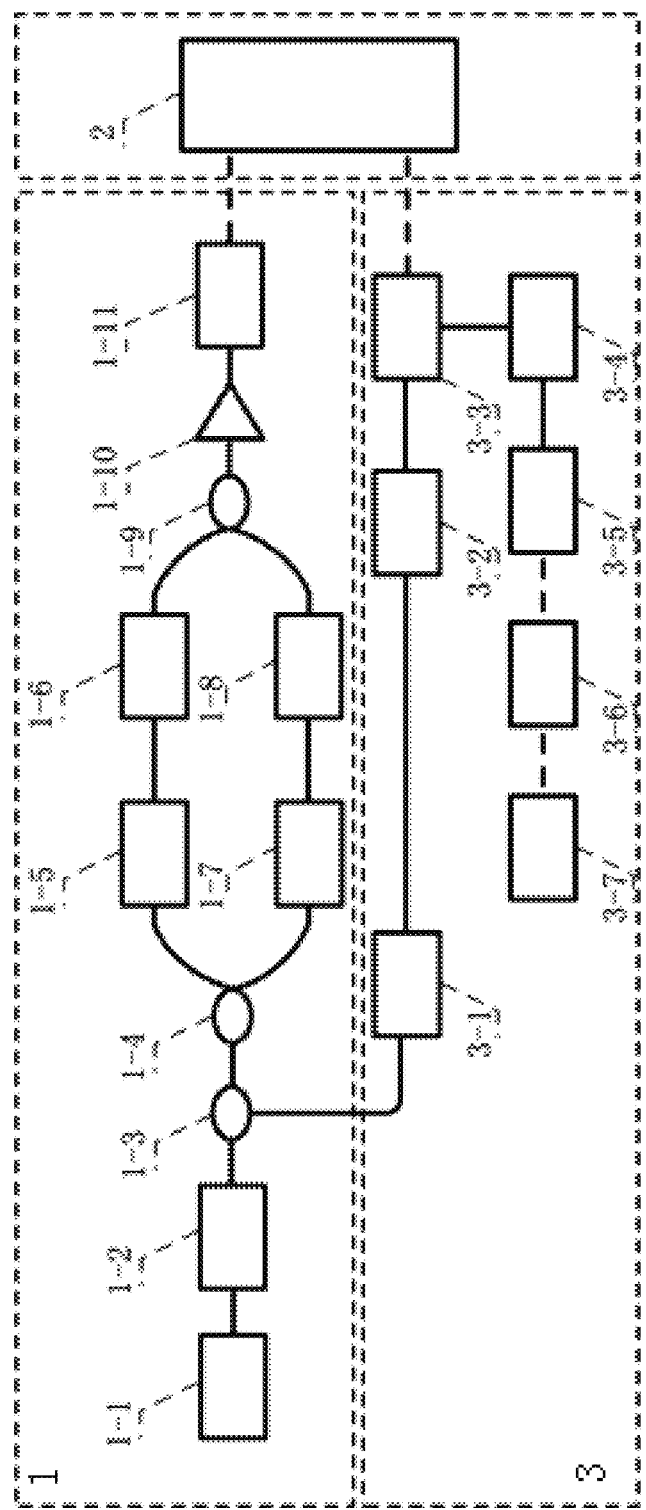
FIG. 1 is a schematic diagram showing the structure of the full-spectrum covering ultra wideband full photonics-based radar system of the present invention.

As shown in FIG. 1, the full-spectrum covering ultra wideband full-photonics based radar system of the present invention comprises a signal transmitter 1, a transceiver module 2, and a signal receiver 3. The signal transmitter comprises a mode-locked laser 1-1, a first dispersion module 1-2, a first optical coupler 1-3, a second optical coupler 1-4, a first optical filter 1-5, a second dispersion module 1-6, a second optical filter 1-7, a first tunable time delay module 1-8, a third optical coupler 1-9, an optical amplifier 1-10, and a first photodetector 1-11.

The signal receiver comprises 3 a third optical filter 3-1, a second tunable time delay module 3-2, an electro-optical modulator 3-3, a third dispersion module 3-4, a second photodetector 3-5, an analog-digital conversion module 3-6, and a signal processing module 3-7.

Figure 2:
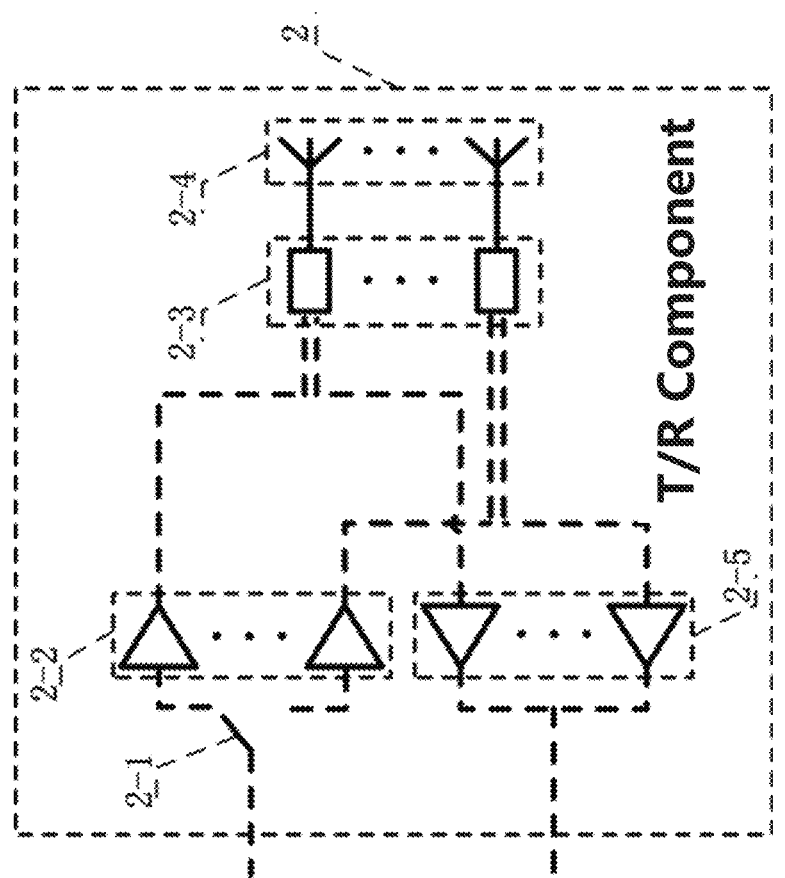
FIG. 2 is a schematic diagram showing the structure of the transceiver module of the present invention.

As shown in FIG. 2, the transceiver module 2 comprises a band selector 2-1, a first electrical amplifier array 2-2, a T/R component array 2-3, an antenna array 2-4, and a second electrical amplifier array 2-5.

The inter relations of the above components are as follows:

A pulse signal outputted by the mode-locked laser 1-1 firstly passes via the first dispersion module 1-2, and is subsequently split into two parts the first optical coupler 1-3, with the first part entering the second optical coupler 1-4, and the remaining part entering the third optical filter 3-1. The second optical coupler 1-4 splits the optical path into a first optical path and a second optical path, with the first optical path traversing successively the first optical filter 1-5 and the second dispersion module 1-6 till the third optical coupler 1-9, the second optical path traversing successively the second optical filter 1-7 and the first tunable time delay module 1-8 till the third optical coupler 1-9.

The third optical coupler couples a signal of the first optical path and of the second optical path respectively into one optical signal and enters successively the optical amplifier 1-10 and the first photodetector 1-11. The first photodetector 1-11 converts the optical signal into an electrical signal and is inputted to the transceiver module.

The band selector 2-1 has multiple output ends, with each output end connected successively with the first electrical amplifier array 2-2, the T/R component array 2-3, and the antenna array 2-4 to form multiple channels. The band selector 2-1 switches the signal to a specific channel in accordance with the waveband of the signal. An echo signal of an electrical signal transmitted from the antenna array 2-4 is returned by a to be detected target and passes successively via the respective antenna of the antenna array, the respective T/R component of the T/R array and the second electrical amplifier array to enter an rf input end of the electro-optical modulator 3-3. The output signal of the electro-optical modulator 3-3 successively passes via the third dispersion module 3-4, the second photodetector 3-5, and the analog-digital conversion module 3-6 to enter the signal processing module 3-7.

The working principle of the present invention is as follows:

The wideband chirp signal generated by the signal transmitter as shown in FIG. 1 is based on spectral filtering and unbalanced dispersive chirping on the first optical path and the second optical path. By means of tuning the center wavelength and filtering bandwidth of the first tunable optical filter 1-5 and those of the second optical filter 1-7, the center frequency and the sweep bandwidth of the wideband chirp signal is changed.

As shown in FIG. 2, for a generated signal with a specific waveband, the band selector switches it to a corresponding channel. The transceiver module amplifies and then transmits via an antenna the signal generated by the signal transmitter, and subsequently receives and amplifies the echo signal.

Figures 3, 3A, 3B:
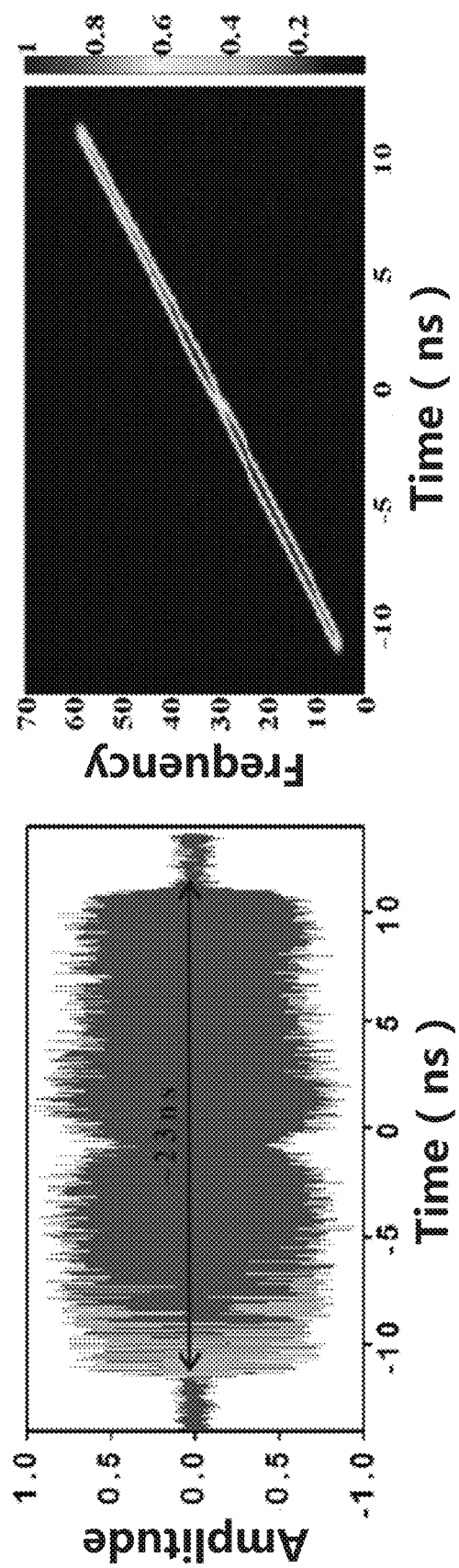

FIG. 3 shows test results for the generated full-spectrum covering wideband chirp signal, wherein FIG. 3(a) shows the time domain waveform, and FIG. 3(b) shows the short time Fourier transformation analysis. The signal range is 5-60 GHz, time width is ~23 ns, and time bandwidth product is as high as ~1265.

FIG. 4 shows test results for short time Fourier analysis of the chip signals with various wavebands, wherein FIG. 4(a) depicts the X waveband (8-12 GHz), FIG. 4(b) depicts the Ku waveband (12-18 GHz), and FIG. 4(c) depicts the Ka waveband (26.5-40 GHz). The signals generated by the signal transmitter testify to the capacity of the ultra wide band radar system with full-spectrum covering or with any arbitrary waveband.

Figure 5:
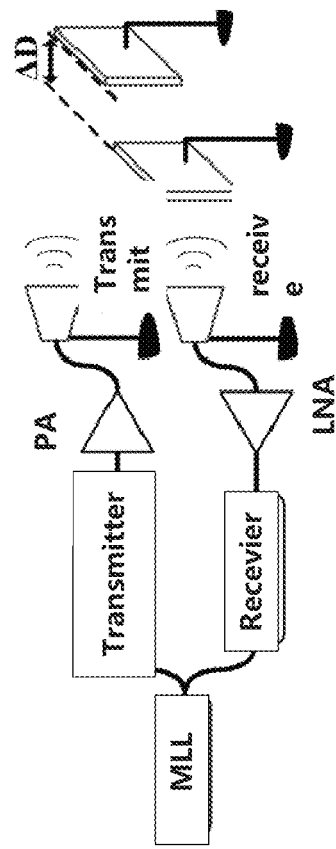
Figure 5:
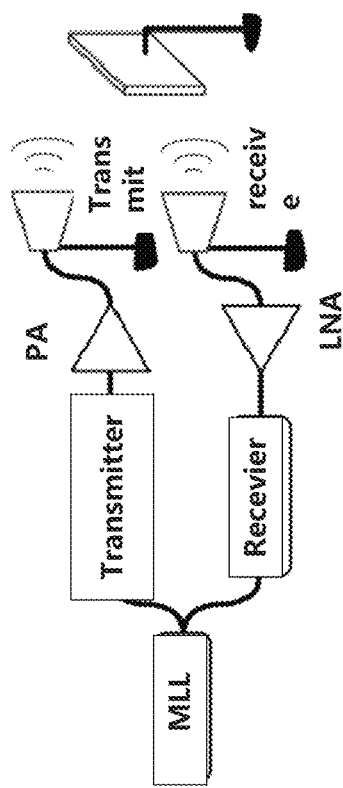

In order to verify the feasibility of the present invention, the signal transmitter generates an X waveband radar signal to detect a target, while the signal receiver receives the echo signal for preliminary experiment verification. FIG. 5 shows a schematic diagram of a single target detection and a double target detection for the embodiment employing X waveband signal generated by the present invention. As shown in FIGS. 5(a) and 5(b), signal transmission and signal reception adopt two independent X waveband horn antennas parallel to one another, with the detected target perpendicular to a metal surface along signal transmission direction. For a transmitting and receiving antenna comprising T/R components, the same effect is achieved.

In the signal receiver, bandwidth compression and down conversion for the echo signal from the transceiver module is realized by the transceiving system based on time stretching. On the basis of the principle of time stretching, the electrical signal is loaded via the electro-optical modulator onto the previously dispersion-chirped optical pulse carrier wave, forming a modulation optical signal corresponding to the electrical signal. With the prerequisite of the filtering bandwidth of the third optical filter 3-4 being greater than that of the first optical filter 1-5 and that of the second optical filter 1-7, and by means of properly tuning the second tunable time delay module 3-2, echo signals from multiple targets are all capable of being loaded onto the optical carrier wave. Subsequent to passing via the third dispersion module 3-4 having much more dispersion, an electrical signal time-stretched multiple times of factor is obtained from the second photodetector 3-5. Time stretching of the to be sampled rf signal is equivalent to compression in frequency domain, and thus pressure on bandwidth and sampling ratio for the back-end analog-digital conversion module 3-6 is greatly mitigated. FIGS. 6 (*a*) and 6(*c*) respectively show test results for the time domain waveform and the short time Fourier analysis of the X waveband signal, while FIGS. 6(*c*) and 6(*d*) respectively show test results for the time domain waveform and the short time Fourier analysis of the reflected X waveband echo signal subsequent to time stretching. Subsequent to time stretching, the X waveband signal is stretched in time domain 5 times over the original time, while frequency and bandwidth are compressed about 5 times. The compressed frequency and bandwidth subsequent to time stretching testifies to mitigation of pressure on back end signal quantization processing.

Target detection employing chirp signals attains good target property, owing to dependency of ranging resolution on the bandwidth of the transmitted signal. Useful target information is then extracted from the analog-digitally converted signal by means of digital processing. Target ranging resolution remains in the accuracy prior to time stretching. FIG. 7 shows time and distance test results between the targets in the double target detection. FIG. 7(*a*) shows time the domain waveform subsequent to time stretching at a distance of ~6.3 cm, FIG. 7(*b*) shows the time domain waveform subsequent to time stretching at a distance of ~15.0 cm, FIG. 7(*c*) shows inter-positions of the both targets subsequent to matched filtering at a distance of ~6.3 cm, while FIG. 7(*d*) shows inter-positions of the both targets subsequent to matched filtering at a distance of ~15.0 cm. The X waveband signal, albeit undergoing time stretching and frequency compression in the signal receiver, retains the original ultra wideband detection accuracy.

We claim:

1. A full-spectrum covering ultra wideband full-photonics based radar system, comprising
a signal transmitter, the signal transmitter further comprising
a mode-locked laser having an output end,
a first dispersion module,
a first optical coupler having an input end, a first output end, and a second output end,
a second optical coupler having an input end,
a first optical filter having a filtering bandwidth,
a second dispersion module,
a second optical filter having a filtering bandwidth,
a first tunable time delay module,
a third optical coupler having an input end,
an optical amplifier, and
a first photodetector,
a transceiver module, the transceiver module further comprising
a band selector having an input end and more than two output ends,
a first electrical amplifier array having electrical amplifiers,
a T/R component array having T/R components,
an antenna array having antennas, and
a second electrical amplifier array, and
a signal receiver, the signal receiver further comprising
a third optical filter having a filtering bandwidth,
a second tunable time delay module,
an electro-optical modulator having an rf input end and an optical input end,
a third dispersion module,
a second photodetector,
an analog-digital conversion module, and
a signal processing module,
wherein the output end of the mode-locked laser is connected via the first dispersion module with the input end of the first optical coupler, and the first output end of the first optical coupler is connected with the input end of the second optical coupler;
the second optical coupler splits an optical path into a first optical path and a second optical path, with the first optical path traversing successively the first optical filter and the second dispersion module till the input end of the third optical coupler, and the second optical path traversing successively the second optical filter and the first tunable time delay module till the input end of the third optical coupler;
the third optical coupler couples a signal of the first optical path and of the second optical path respectively into one optical signal and outputs via the optical amplifier to enter the first photodetector;
the first photodetector converts the optical signal into an electrical signal and inputs to the input end of the band selector of the transceiver module, each of the output ends of the band selector is connected successively with the respective electrical amplifier of the first electrical amplifier array, the respective T/R component of the T/R component array, and the respective antenna of the antenna array, to form a channel for a respective waveband;
an echo signal of an electrical signal transmitted from the antenna array is returned by a to-be-detected target and passes successively via the respective antenna of the antenna array, the respective T/R component of the T/R array, and the second electrical amplifier array to form a target echo electrical signal to be inputted to the rf input end of the electro-optical modulator;
an optical signal of the second output end of the first optical coupler successively passes via the third optical filter and the second tunable time delay module to be inputted into the optical input end of the electro-optical modulator to form an optical pulse carrier wave;
the electro-optical modulator loads the target echo electrical signal onto the optical pulse carrier wave to form an echo modulation optical signal corresponding to the target echo electrical signal, with the echo modulation optical signal of the electro-optical modulator successively passing via the third dispersion module, the second photodetector, and the analog-digital conversion module to enter the signal processing module.

2. The full-spectrum covering ultra wideband full-photonics based radar system of claim 1, wherein the mode-locked laser is a mode-locked laser with low jitter and wide spectrum.

3. The full-spectrum covering ultra wideband full-photonics based radar system of claim 1, wherein the filtering bandwidth of the third optical filter is greater than the filtering bandwidth of the first optical filter and the filtering bandwidth of the second optical filter.

4. The full-spectrum covering ultra wideband full-photonics based radar system of claim 2, wherein the filtering bandwidth of the third optical filter is greater than the filtering bandwidth of the first optical filter and the filtering bandwidth of the second optical filter.

* * * * *